United States Patent [19]

Cinotti

[11] Patent Number: 5,283,810
[45] Date of Patent: Feb. 1, 1994

[54] PRESSURIZED WATER NUCLEAR REACTOR WITH INHERENT SAFETY

[75] Inventor: Luciano Cinotti, Genova, Italy

[73] Assignee: Ansaldo S.P.A., Genova, Italy

[21] Appl. No.: 918,330

[22] Filed: Jul. 21, 1992

[30] Foreign Application Priority Data

Aug. 14, 1991 [IT] Italy .................... 91 A 002258

[51] Int. Cl.$^5$ .............................................. G21C 9/00
[52] U.S. Cl. .................... 376/282; 376/299; 376/406
[58] Field of Search ............. 376/282, 219, 299, 291, 376/328, 406; 976/DIG. 23, DIG. 148

[56] References Cited

U.S. PATENT DOCUMENTS

| | | | |
|---|---|---|---|
| 3,401,082 | 9/1968 | Ammon | 376/282 |
| 4,666,654 | 5/1987 | Forsberg | 376/219 |
| 4,737,337 | 4/1988 | Garabedian et al. | 376/299 |
| 5,075,070 | 12/1991 | Costes | 376/293 |
| 5,112,569 | 5/1992 | Cinotti | 376/282 |

FOREIGN PATENT DOCUMENTS 0157321 10/1985 European Pat. Off. .

*Primary Examiner*—Donald P. Walsh
*Assistant Examiner*—Meena Chelliah
*Attorney, Agent, or Firm*—Robbins, Berliner & Carson

[57] ABSTRACT

A presurised-water nuclear reactor with inherent safety comprises a pressurised vessel filled with borated water within which is the body of the reactor. The latter includes an upper part and a lower part within which is the reactor core. The upper part includes a first tubular cavity, a second tubular cavity coaxial with and outside the first cavity and a plurality of helical tube bundles extending between respective pairs of connectors for the inlet and outlet of water circulating in the tube bundles.

5 Claims, 6 Drawing Sheets

PRESSURIZED WATER NUCLEAR REACTOR WITH INHERENT SAFETY

The present invention relates to a pressurised-water nuclear reactor with inherent safety, comprising an outer pressure vessel constituted essentially by a cylindrical wall closed at its ends by a hemispherical upper wall and a hemispherical bottom wall, the vessel being filled, moreover, with borated water and housing within it a body of the reactor including bundles of tubes for generating steam extending between respective connectors for the inlet and outlet of water to a container, and a reactor core.

A nuclear reactor of the aforesaid type is already known from Italian Patent Application No 12545-A/88; this reactor comprises essentially a main pressure vessel filled with borated water which constitutes the medium for slowing the neutrons generated by the nuclear reaction which occurs within the reactor.

More particularly, a reactor tank is immersed in the borated water within the vessel; this has an upper portion constituted essentially by a cylindrical cavity concentric with the pressure vessel and which houses a steam generator of the tube-bundle type; furthermore, the core of the reactor is in a lower portion of the tank.

The tank communicates with the main pressure vessel through a first series of tubes beneath the reactor core and a second series of tubes above the steam generator and through which it is possible to circulate borated water to and from the said tank; these tubes constitute a safety system for the reactor which is also called a "density lock".

In this reactor, an inlet connector and an outlet connector are located diametrally opposite each other on the outer wall of the cylindrical cavity and are disposed on the same cross section of the main vessel. These connectors enable water to be circulated through the tube bundles which form part of a secondary water circuit of the reactor.

More particulary, the inlet and outlet connectors of the secondary circuit pass through the wall of the pressure vessel to reach the steam generator in the reactor tank.

In this type of reactor, the tank is suspended within the pressure vessel in correspondence with the inlet and outlet for the water in the secondary circuit.

This solution is constructed so as to allow thermal expansion between the reactor tank and the main vessel; in fact, during operation of the reactor, the tank is at the same temperature as the primary circuit while the main vessel is cold since its outside is wetted by cold water in a bath in which the vessel is immersed.

The construction of the reactor, with the bottom of the tank free to move longitudinally relative to the vessel, relieves the reactor of any undesirable tensions which could arise as a result of the said thermal expansion.

This solution, while representing a considerable progress over the known prior art, does however have some disadvantages which limit its effectiveness.

Principally, a reactor tank fixed in this manner is not sufficiently secure and stable within the pressure vessel. In this type of reactor there is in fact a risk of vibrations being produced during normal functioning which could even cause the tank to become detached from its support points in the vessel, with all the harmful consequences imaginable which this would cause.

Furthermore, the aseismic design of various details of this type of reactor, and hence also of the tank, is generally complicated.

It should in fact be noted that, in nuclear rectors, safety is of fundamental importance and the maximum efforts are directed towards it both during design and during the manufacture of all the structural components; it is thus necessary for the entire reactor to offer specific guarantees of stability and safety against any operational eventuality.

Finally a reactor tank which contains both the steam generator and the core presents enormous difficulties with regard to its removal which is necessary during assembly and dismantling for maintenance of the reactor.

The technical problem behind the present invention is that of devising a pressurised-water, nuclear reactor with so-called inherent safety, with structural and functional characteristics such as to overcome the problems mentioned with reference to the prior art example.

This problem is resolved by a reactor of the type considered above, characterised in the subsequent claims.

The characteristics and advantages of the invention will become more apparent from the description of one embodiment thereof, given below by way of non-limiting example with reference to the appended drawings, in which.

With reference to these drawings, a nuclear reactor according to the invention is generally indicated 1 and includes an outer cylindrical pressure vessel 2 filled with borated water; more particularly, the pressure vessel 2 comprises a cylindrical wall 2c closed at its upper and lower ends respectively by corresponding hemispherical end walls 2a and 2b. The pressure vessel 2 is of the type which is immersed in a bath and in this example is supported on the floor of the latter, shown schematically in FIGS. 2 and 3, by conventional means which are not therefore considered in the present description.

Figure 1:
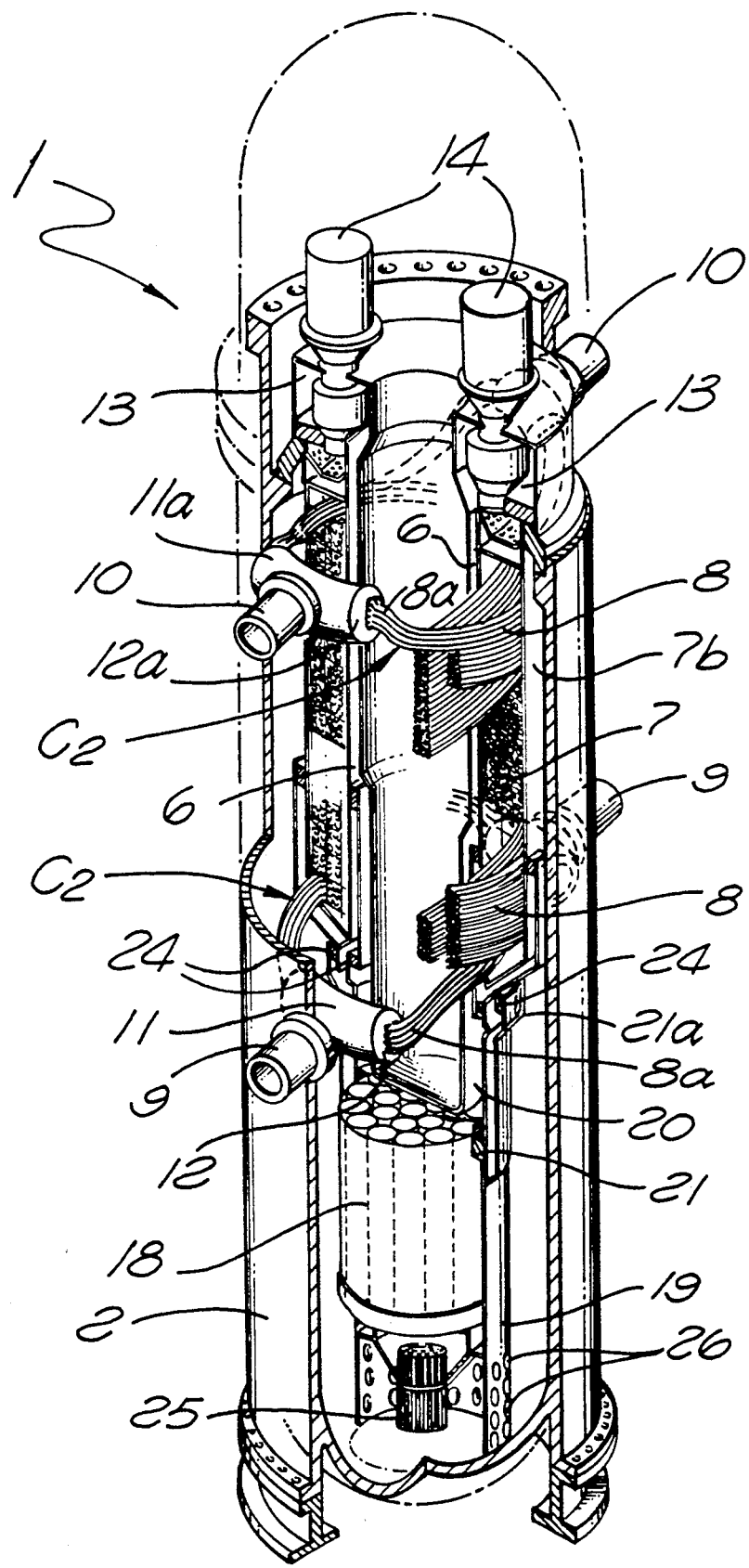
FIG. 1 is a partially-sectioned perspective view of a nuclear reactor according to the invention.
Figure 2:
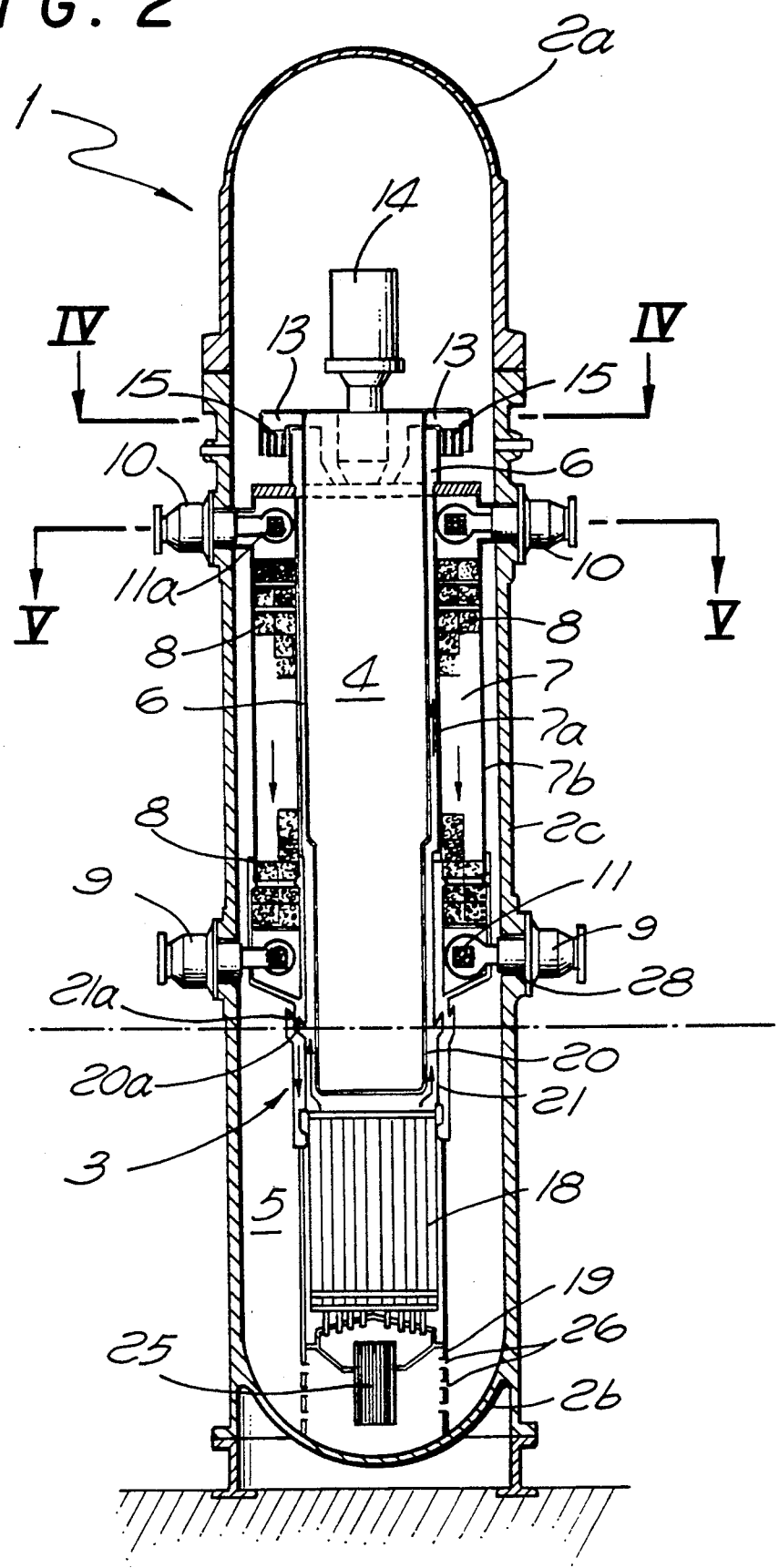
FIG. 2 is longitudinally-sectioned elevational view of the nuclear reactor of FIG. 1.

Within the pressure vessel 2 is a body 3 of the reactor which comprises two portions 4 and 5 which are functionally distinct and separated as will become clearer below: these are, respectively, an upper portion 4 and a lower portion 5. With particular reference to FIG. 2, within the upper portion 4 are formed a first tubular cavity 6 coaxial with the wall 2c for the passage of borated water circulating in a primary circuit C1 of the reactor, which will be more fully explained below, and a second tubular cavity 7 coaxial with and surrounding the first, within which is a series of helical tube bundles 8.

A pair of inlet connectors 9 for pure water circulating in a secondary circuit C2 of the reactor and a pair of outlet connectors 10 for the water from the secondary circuit C2 are located along two diametrally opposed generatrices of the second cavity 7 on two cross-sections of the cavity at different heights from each other. More particularly, the outlet connectors 10 are at a higher level than the inlet connectors 9.

Figure 5:
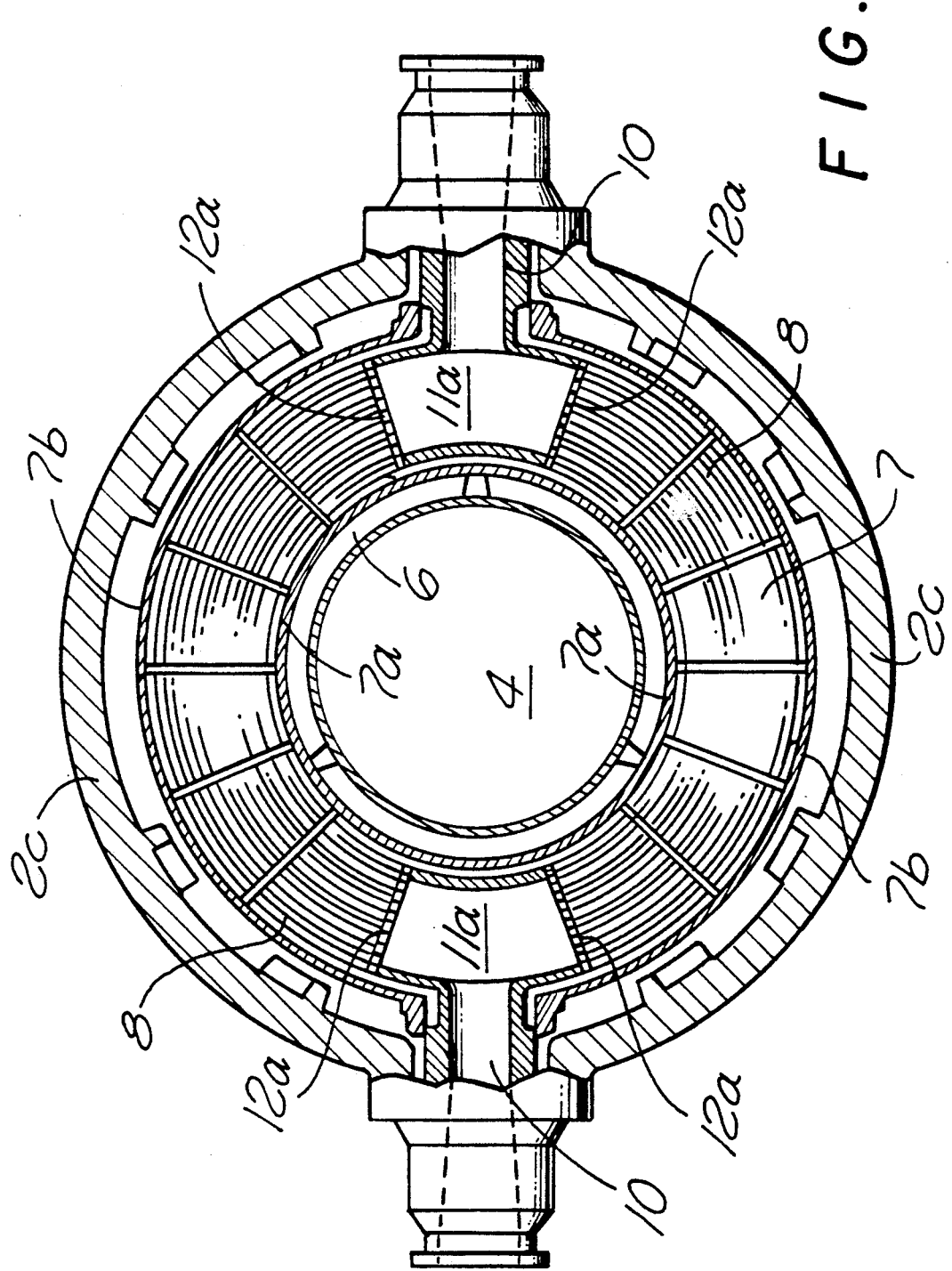
FIG. 5 is a section of the reactor of the invention taken on the line V—V of FIG. 2.

The connectors 9 and 10 have respective diffusers 11 and 11a which extend transverse the inlet and outlet water flows in the secondary circuit C2 and are each substantially in the form of part of a toroid; each of the diffusers 11 and 11a has respective tube plates 12 and 12a at respective opposite ends. These latter lie in radial planes relative to the cylindrical geometry of the reactor (only the plates 12a are shown in FIG. 5).

The tube plates 12 and 12a are connected to corresponding helical tube bundles 8; more particularly, the connection of each bundle 8 is achieved through a respective bent end portion 8a which extends from the respective tube plate 12 and 12a and is connected to the tube bundle proper.

The tube bundles 8 extend helically within the second cavity 7 in alternating right-hand and left-hand helices each of which extends from the respective tube plate 12 associated with the inlet connectors 9 to the corresponding tube plate 12a associated with the outlet connectors 10.

In fact, the helical course of each tube bundle 8 obviously depends on the tube plate 12 to which it is connected in that two tube bundles 8 extend from each diffuser 11, that is, one from each plate 12, with a right-hand and left-hand development respectively.

Figure 6:
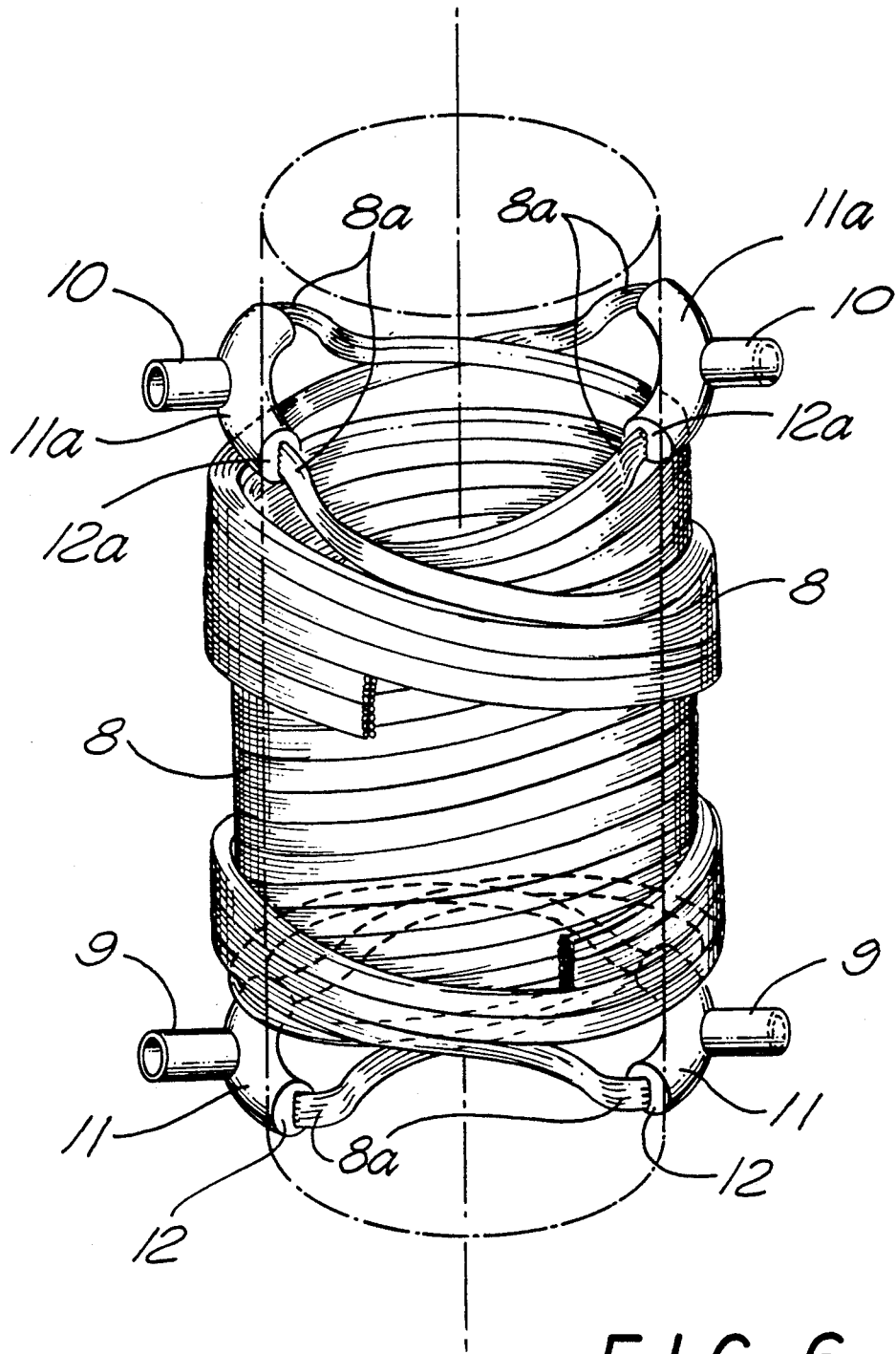
FIG. 6 is a perspective view of a detail of the nuclear reactor of FIG. 1 on an enlarged scale.

Furthermore, the concordant helical tube bundles 8, as seen in FIG. 6, are staggered in that they extend from pairs of diffusers 11 or 11a which are diametrally opposite each other; this enables the tube bundle of one helix to be housed in the space between successive turns of that tube bundle which extends from the opposite diffuser.

Finally, in this embodiment of the present invention, the tubes of each bundle 8 extend from the respective tube plates 12 and 12a in vertically arrangement such that the helical development of the bundles lie on concentric cylindrical surfaces.

The upper portion 4 of the reactor 1 also includes two chambers 13 in positions overlying the second cavity 7 for conveying borated water circulating in the primary circuit C1 of the reactor to a respective pair of pumps 14 for supplying the said primary circuit.

The first tubular cavity 6, which is traversed by water in the primary circuit, is connected hydraulically to the interior of the pressure vessel 2 through a series of ducts 15 which constitute a first "density lock" of the nuclear reactor 1. The second tubular cavity 7 is defined by an inner wall 7a and a concentric wall 7b; the lower portions of these walls have a series of apertures 16 communicating with a region 17 for collecting the borated water in the primary circuit C1.

The lower portion 5 of the nuclear reactor houses the core 18 thereof which rests on a supporting skirt 19 fixed to the bottom wall 2b of the pressure vessel 2. Respective first and second tubular chambers 20 and 21 for the passage of water in the primary circuit C1 extend upwardly from the top of the core 18. More precisely, these chambers 20 and 21 are in the form of concentric, tubular cavities, the first chamber 20 being located inside the second chamber 21.

Both of the chambers 20 and 21 have corresponding flared upper edges 20a and 21a for forming bell and spigot joints 22 and 23 with the first cavity 6 and with the water collecting region 17 respectively. The division between the upper portion 4 and the lower portion 5 of the body 3 of the nuclear reactor is in correspondence with each of the bell and spigot joints 22 and 23.

A limited-loss seal 24 is provided in each joint 22 and 23 and comprises essentially a pair of conventional resilient rings of a type similar to the resilient rings mounted on the pistons of ordinary combustion engines.

Housed beneath the core 18 within the supporting skirt 19 is a bundle of ducts 25 which constitute a second "density lock" of the nuclear reactor.

The supporting skirt 19 for the core 18 has apertures 26 for allowing the passage of borated water in the pressure vessel 2 to the reactor core 18 and through the bundle of ducts 25.

The walls separating the primary circuit C1 from the cooled borated water in the vessel are insulated to reduce heat dispersion from the primary circuit C1. In particular, the inner wall of the first cavity 6 and the outer wall 7b of the second cavity 7 are insulated.

Figure 3:
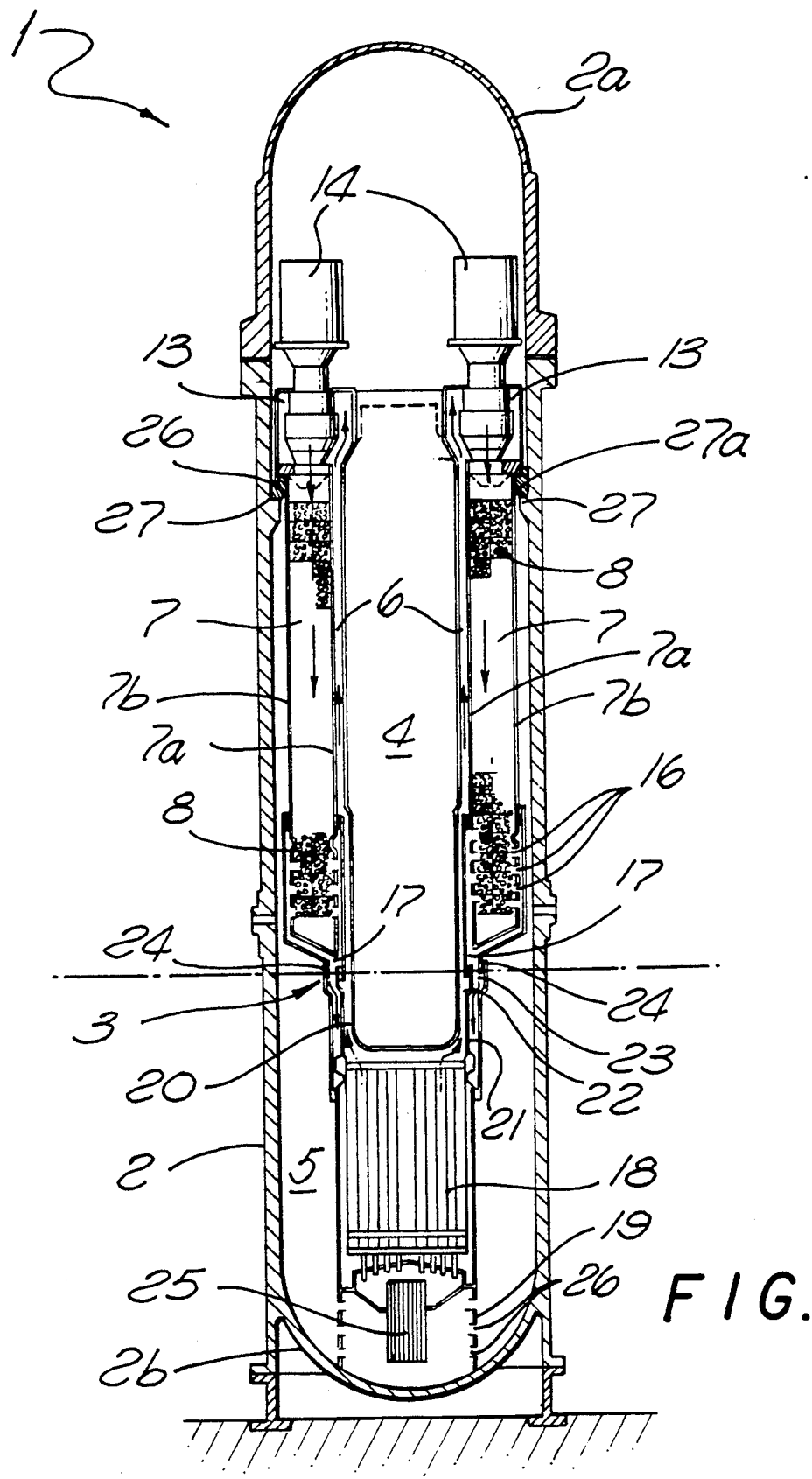
FIG. 3 is a section of the reactor of the invention taken on the line III—III of FIG. 4.
Figure 4:
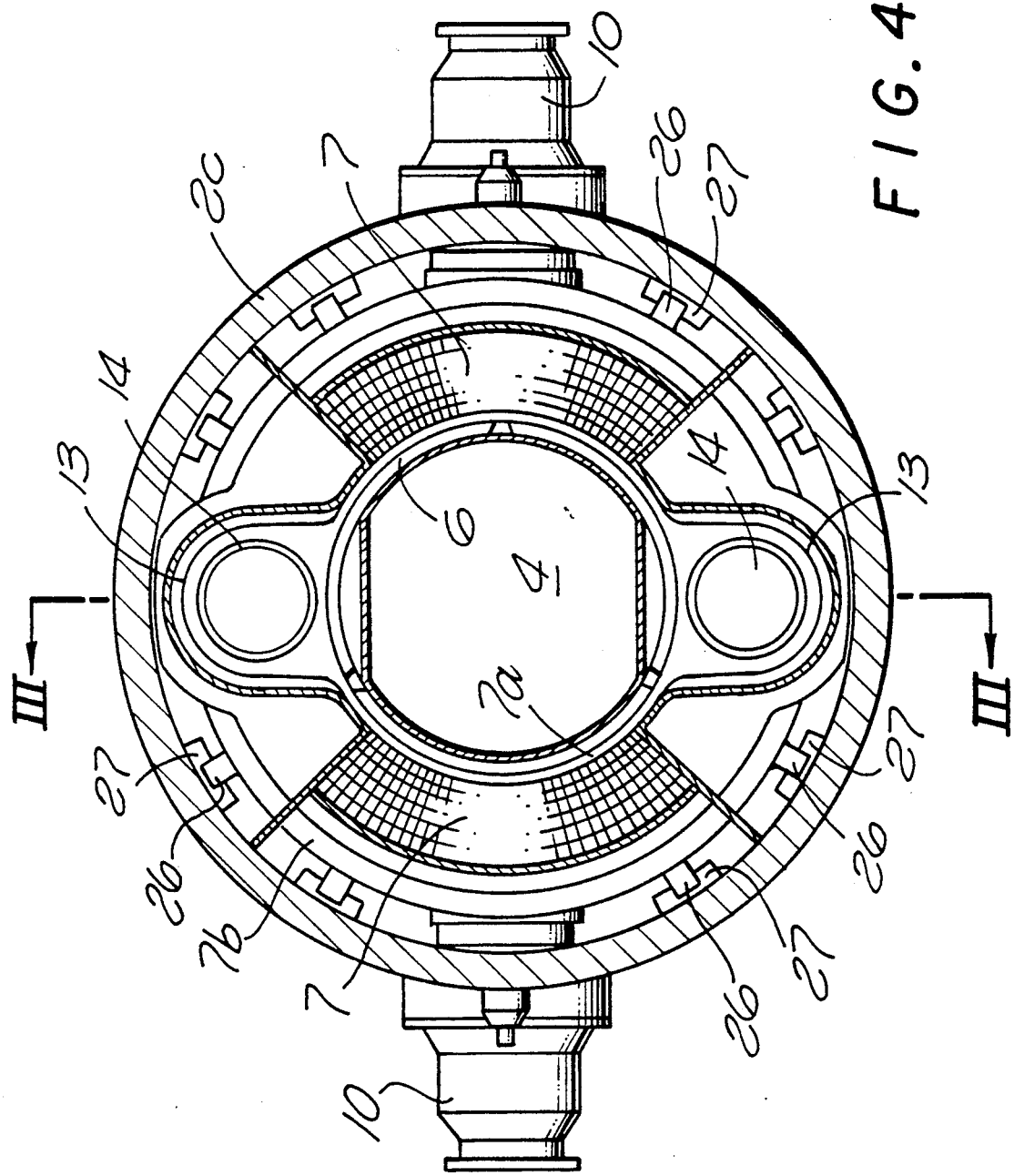
FIG. 4 is a section of the reactor according to the invention taken on the line IV—IV of FIG. 2.

With reference to FIG. 3, the upper portion 4 of the body 3 of the reactor is fixed to the cylindrical wall 2c of the pressure vessel 2 by a plurality of appendages 27 provided on the outer wall 7b of the cavity 7. These appendages 27 are engaged with a corresponding plurality of projections 27a on the cylindrical wall 2C of the pressure vessel 2.

Furthermore, the pair of outlet connectors 10 pass through the outer wall 7b of the cavity 7 and are free to slide relative to their longitudinal axes. Similarly, the connectors 9 pass through the wall 7b and can slide relative thereto axially of the cylindrical cavity 7 as well as with respect to their longitudinal axes. For this purpose, that is to enable the connectors 9 to slide in two directions relative to the cavity 7, the connectors 9 have sliding seals 28 of conventional type. The pairs of connectors 9 and 10 are fixed rigidly to the cylindrical wall 2c.

The operation of the reactor according to the invention, with particular reference to some of its component parts, is as follows.

The supply pumps 14 circulate the borated water in the primary circuit C1 which has the path defined below. The water flows through the second cavity 7 downwardly towards the core 18 of the reactor; in particular, the water reaches the apertures 16 in the lower part of the inner wall 7a of the cavity 7 where it may enter the collecting region 17 and from here, passing through the second annular chamber 21, reach reactor core 18. Once it has flowed over the core 18 the water, which is heated thereby, has a lower density and rises into the first annular chamber 20 and passes through the first cavity 6 to reach the intakes 13 of the pumps 14 from where it is again supplied to the second cavity 7 to flow over the tube bundle 8 in the latter.

The primary circuit C1 for the borated water for the reactor thus having been defined, water in the secondary circuit C2 circulates through the tube bundles 8; this latter includes the bundles 8, in which the water flows by virtue of the inlet and outlet connectors 9 and 10, and is converted into steam within these bundles by heat exchange with the borated water in the primary circuit C1. From here the water converted into steam is directed to the rest of the secondary circuit C2 where it will produce energy.

Many advantages are achieved by the nuclear reactor formed in accordance with the present invention.

Indeed it is important to note that the upper portion 4 of the body 3 of the reactor is connected rigidly to the pressure vessel 2 by the appendages 27.

At the same time, the lower portion 5 of the body of the reactor, and thus also the core 18 within it, is supported from beneath by the supporting skirt 19 whereby it is connected rigidly to the bottom 2b of the pressure vessel; the reactor core 18 is thus housed in complete safety within the pressure vessel 2, contributing to the achievement of a considerable degree of safety for the entire reactor even should vibrations occur during its operation.

This safety also results from the fact that the upper portion 4 and the lower portion 5 are not rigidly interconnected but are mutually slidable by virtue of the bell and spigot joints 22 and 23 and the particular sliding seals 28 which compensate for any major thermal expansion which occurs during operation of the reactor. In particular, the dimensions of the outer wall 7b of the tubular cavity 7, which is washed by water heated by the core 18 and is thus at a high temperature, will vary considerably and if these variations were not compensated for suitably, could give rise to considerable problems and dangers.

To advantage, moreover, the expansion of the tube bundles 8 of the reactor of the invention is compensated for by their particular helical shape as well as by the presence of the bent end portions adjacent the tube plates. This factor also enables a nuclear reactor to be formed in which the inlet connectors 9 and the outlet connectors 10 for the water in the secondary circuit C2 remain fixed in space while the rest of the reactor is free to expand while remaining firmly housed within the pressure vessel 2.

Since the water in the primary circuit leaves the cavity 7 mainly through the apertures 16, a further advantage of the reactor according to the invention is that of avoiding dangerous vibrations in the tube bundles 8 at the points at which they are connected to the respective plates 12 and 12a; for example, in correspondence with the lower connectors 9, the apertures 16 are provided in such a manner as to allow the water in the primary circuit to flow at low speed, minimising the danger of the said vibrations.

Furthermore, it is important to note that the reactor according to the invention achieves a considerable saving in the length of the tube bundles for a given heat exchange.

This result, which is a considerable improvement over the prior art in which the inlet and outlet connectors for the water are located on the same cross-section of the nuclear reactor in order to allow the expansion of the tube bundles, is achieved by the fact that, in the invention, the tube bundles extend between inlet and outlet connectors located at different heights from each other. This enables the tube bundles to be arranged in more rational configurations, which are very compact, such as the helical configurations described a short time ago instead of "U" or like configurations as in the prior art.

The compactness of the tube bundles brings further advantages indirectly, such as a considerable saving in expense due to the length of the tube bundles as well as greater ease of maintenance.

In the reactor of the present invention, the subdivision of the body 3, as well as giving the considerable functional advantages just seen, gives the entire reactor a very high degree of general safety by preventing the transmission of mechanical stress which would be harmful to the core 18 while maintaining this firmly housed within its vessel 2.

It should not be excluded that constructional variants and modifications may be made to the invention described which should nevertheless be considered as falling within the protective scope defined by the following claims.

I claim:

1. A pressurized-water nuclear reactor with inherent safety, comprising:

an outer pressure vessel in form of a vertical cylinder having a cylindrical wall, a hemispherical upper wall and a hemispherical bottom wall, said vessel being filled with borated water;

a reactor body placed inside said vessel and axially extending therewith, said reactor body comprising an axially extending upper portion fixed to said cylindrical wall and an axially extending lower portion fixed to said bottom wall, said upper and lower portions being each other hydraulically interconnected and mutually axially slidable;

steam generating tube bundles extending between inlet and outlet connectors passing through said cylindrical wall, said tube bundles being housed in said upper portion of the reactor body; and a reactor core housed in said lower portion of the reactor body.

2. A pressurized-water nuclear reactor according to claim 1, wherein said axially extending upper portion of said reactor body includes a first tubular cavity and a second tubular cavity coaxial with and surrounding said first tubular cavity, a plurality of helical tube bundles, housed in said second tubular cavity and extending between respective pairs of inlet connectors and pairs of outlet connectors, arranged in diametrically opposed pairs on transverse cross sections, said pairs of inlet connectors being located along the axial extension of said upper portion at a vertical level lower than said pairs of outlet connectors, and sliding seals between each pairs of inlet and outlet connectors and said cylindrical wall of the vessel.

3. A pressurized-water nuclear reactor according to claim 2, wherein each of said connectors comprises a longitudinally extending portion which is connected to a respective one of the tube bundles by means of a diffuser in the form of a part of a toroid body extending transversely to the longitudinal axis of said longitudinally extending portion.

4. A pressurized-water nuclear reactor according to claim 3, wherein said toroid body of the diffuser comprises tube plates from which corresponding ones of the tube bundles extend.

5. A pressurized-water nuclear reactor according to claim 4, wherein the tube bundles comprise bent end portions for connection to said tube plates.

* * * * *